(12) United States Patent
Green (10) Patent No.: US 7,683,359 B2
(45) Date of Patent: *Mar. 23, 2010

(54) STRUCTURED SILICON ANODE

(75) Inventor: Mino Green, London (GB)

(73) Assignee: Nexeon Ltd., Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/333,443

(22) Filed: Dec. 12, 2008

(65) Prior Publication Data

US 2009/0130563 A1    May 21, 2009

Related U.S. Application Data

(60) Continuation of application No. 12/074,642, filed on Mar. 4, 2008, which is a division of application No. 10/533,822, filed as application No. PCT/GB03/04783 on Nov. 5, 2003, now Pat. No. 7,402,829.

(30) Foreign Application Priority Data

Nov. 5, 2002   (GB)   .................. 0225779.8

(51) Int. Cl.
   *H01L 29/00*   (2006.01)
(52) U.S. Cl. .................. 257/1; 257/2; 257/3; 257/4; 257/5; 320/107; 977/932; 977/948; 977/810; 977/701; 324/252
(58) Field of Classification Search .................. 257/1–5, 257/329.002, E29.002; 438/95, 800, 900; 320/107; 429/52; 324/252; 977/948, 932, 977/810, 701
   See application file for complete search history.

(56) References Cited

U.S. PATENT DOCUMENTS

| | | | |
|---|---|---|---|
| 3,351,445 A | 11/1967 | Fielder et al. | |
| 4,002,541 A | 1/1977 | Streander | |
| 4,436,796 A | 3/1984 | Huggins et al. | |
| 4,950,566 A | 8/1990 | Huggins et al. | |
| 5,262,021 A | 11/1993 | Lehmann et al. | |
| 5,907,899 A | 6/1999 | Dahn et al. | |
| 6,022,640 A | 2/2000 | Takada et al. | |
| 6,042,969 A | 3/2000 | Yamada et al. | |
| 6,296,969 B1 | 10/2001 | Yano et al. | |
| 6,334,939 B1 | 1/2002 | Zhou et al. | |
| 6,337,156 B1 | 1/2002 | Narang et al. | |
| 6,353,317 B1 | 3/2002 | Green et al. | |
| 6,399,177 B1 * | 6/2002 | Fonash et al. | ................ 428/119 |
| 6,916,679 B2 | 7/2005 | Snyder et al. | |
| 7,070,632 B1 | 7/2006 | Visco et al. | |

(Continued)

FOREIGN PATENT DOCUMENTS

| | | |
|---|---|---|
| DE | 103 47 570 A1 | 5/2005 |
| EP | 0 820 110 A2 | 1/1998 |
| EP | 1 011 160 A1 | 6/2000 |
| EP | 0 936 687 B1 | 12/2001 |
| EP | 1 231 654 A1 | 8/2002 |

(Continued)

OTHER PUBLICATIONS

Badel et al., "Formation of Ordered Pore Arrays at the Nanoscale by Electrochemical Etching of N-Type Silicon", Superlattices and Microstructures, 36 (2004) 245-253.

(Continued)

*Primary Examiner*—Bradley K Smith
*Assistant Examiner*—Jami M Valentine
(74) *Attorney, Agent, or Firm*—Fay Sharpe LLP (57) ABSTRACT

A silicon/lithium battery can be fabricated from a substrate. This allows the battery to be produced as an integrated unit on a chip. The battery includes an anode formed from an array of submicron structures including silicon fabricated on a substrate and a cathode including lithium.

19 Claims, 11 Drawing Sheets

U.S. PATENT DOCUMENTS

| | | |
|---|---|---|
| 7,094,499 B1 | 8/2006 | Hung |
| 7,147,894 B2 | 12/2006 | Zhou et al. |
| 7,192,673 B1 | 3/2007 | Ikeda et al. |
| 7,311,999 B2 | 12/2007 | Kawase et al. |
| 7,318,982 B2 | 1/2008 | Gozdz et al. |
| 7,348,102 B2 | 3/2008 | Li et al. |
| 7,358,011 B2 | 4/2008 | Fukuoka et al. |
| 7,378,041 B2 | 5/2008 | Asao et al. |
| 7,425,285 B2 | 9/2008 | Asao et al. |
| 2001/0023986 A1 | 9/2001 | Mancevski |
| 2001/0038125 A1* | 11/2001 | Ohyanagi et al. ............ 257/347 |
| 2002/0192441 A1* | 12/2002 | Kalkan et al. ............... 428/209 |
| 2003/0135989 A1 | 7/2003 | Huggins et al. |
| 2003/0185743 A1* | 10/2003 | Ramasamy et al. ...... 423/594.4 |
| 2004/0072067 A1 | 4/2004 | Minami et al. |
| 2004/0185346 A1 | 9/2004 | Takeuchi et al. |
| 2004/0197660 A1 | 10/2004 | Sheem et al. |
| 2004/0224231 A1 | 11/2004 | Fujimoto et al. |
| 2004/0241548 A1 | 12/2004 | Nakamoto et al. |
| 2005/0042515 A1 | 2/2005 | Hwang et al. |
| 2005/0079420 A1 | 4/2005 | Cho et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 | 9/2005 | Aramata et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0057463 A1 | 3/2006 | Gao et al. |
| 2006/0088767 A1 | 4/2006 | Li et al. |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2007/0031733 A1 | 2/2007 | Kogetsu et al. |
| 2007/0059598 A1 | 3/2007 | Yang |
| 2007/0087268 A1 | 4/2007 | Kim et al. |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0207080 A1 | 9/2007 | Yang |
| 2007/0207385 A1 | 9/2007 | Liu et al. |
| 2007/0209584 A1 | 9/2007 | Kalynushkin et al. |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |

FOREIGN PATENT DOCUMENTS

| | | |
|---|---|---|
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| FR | 2 885 913 B1 | 8/2007 |
| GB | 2 395 059 A | 5/2004 |
| JP | 10-83817 | 3/1998 |
| JP | 10-199524 | 7/1998 |
| JP | 2001-291514 | 10/2001 |
| JP | 2002-313319 A | 10/2002 |
| JP | 2003-017040 | 1/2003 |
| JP | 2003-168426 | 6/2003 |
| JP | 2004-296386 A | 10/2004 |
| NL | 1015956 | 8/2000 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/47185 A2 | 6/2002 |
| WO | WO 03/063271 A1 | 7/2003 |
| WO | WO 03/075372 A2 | 9/2003 |
| WO | WO 2004/042851 A2 | 5/2004 |
| WO | WO 2004/052489 A2 | 6/2004 |
| WO | WO 2004/083490 A2 | 9/2004 |
| WO | WO 2006/073427 A2 | 7/2006 |
| WO | WO 2006/120332 A2 | 11/2006 |
| WO | WO 2007/044315 A1 | 4/2007 |
| WO | WO 2007/083155 A1 | 7/2007 |
| WO | WO 2007/114168 A1 | 10/2007 |
| WO | WO 2008/029888 A1 | 3/2008 |
| WO | WO 2008/044683 A1 | 4/2008 |
| WO | WO 2008/072460 A1 | 6/2008 |

OTHER PUBLICATIONS

Beaulieu et al., "Colossal Reversible Volume Changes in Lithium Alloys", Electrochemical and Solid-State Letters, 4 (9) (2001) A137-A140.

Beaulieu et al., "Reaction of Li with Grain-Boundary Atoms in Nanostructured Compounds", Journal of the Electrochemical Society, 147 (9) (2000) 3206-3212.

Besenhard et al., "Will Advanced Lithium-Alloy Anodes Have a Chance in Lithium-Ion Batteries?", Journal of Power Sources, 68 (1997) 87-90.

Boukamp et al., "All-Solid Lithium Electrodes with Mixed-Conductor Matrix", J. Electrochem. Soc.: Electrochemical Science and Technology, vol. 128, No. 4, (1981) 725-729.

Bourderau, et al., "Amorphous Silicon as a Possible Anode Material for Li-Ion Batteries", Journal of Power Sources, 81-82 (1999) 233-236.

Colinge, Jean-Pierre, "Silicon-on-Insulator Technology: Materials to VLSI", Chapter 2, SOI Materials, (1991), Cover page and p. 38.

Deal et al., "General Relationship for the Thermal Oxidation of Silicon", Journal of Applied Physics, vol. 36, No. 12, (Dec. 1965) 3770-3778.

Feng et al., "Lithography-Free Silicon Micro-Pillars as Catalyst Supports for Microfabricated Fuel Cell Applications", Electrochemistry Communications, 8 (2006) 1235-1238.

Green et al., "Quantum Pillar Structures on n+ Gallium Arsenide Fabricated Using "Natural" Lithography", Appl. Phys. Lett., 62 (3) (1993) 264-266.

Green et al., "Structured Silicon Anodes for Lithium Battery Applications", Electrochemical and Solid-State Letters, 6 (5) (2003) A75-A79.

Green et al., "Mesoscopic Hemisphere Arrays for use as Resist in Solid State Structure Fabrication", J. Vac. Sci. Technol. B 17(5) (1999) 2074-2083.

Yan et al., "Growth of Amorphous Silicon Nanowires via a Solid-Liquid-Solid Mechanism", Chemical Physics Letters, 323 (2000) 224-228.

Shin et al., "Porous Silicon Negative Electrodes for Rechargeable Lithium Batteries", Journal of Power Sources, 139 (2005) 314-320.

Li et al., "A High Capacity Nano-Si Composite Anode Material for Lithium Rechargeable Batteries", Electrochemical and Solid-State Letters, 2 (11) (1999) 547-549.

Li et al., "The Crystal Structural Evolution of Nano-Si Anode Caused by Lithium Insertion and Extraction at Room Temperature", Solid State Ionics, 135 (2000) 181-191.

Huggins, Robert A., "Lithium Alloy Anodes" in Handbook of Battery Materials, J.O. Besenhard Ed., Wiley-VCH, Weinheim, 361-381 (1999).

Chang et al., "Ultrafast Growth of Single-Crystalline Si Nanowires", Materials Letters, 60 (2006) 2125-2128.

Kim et al., "Improvement of Silicon Powder Negative Electrodes by Copper Electroless Deposition for Lithium Secondary Batteries", Journal of Power Sources, 147 (2005) 227-233.

Jianfeng et al., "Large-Scale Array of Highly Oriented Silicon-Rich Micro/Nanowires Induced by Gas Flow Steering", Solid State Communications, 133 (2005) 271-275.

Lu et al., "A Study of the Mechanisms of Erosion in Silicon Single Crystals Using Hertzian Fracture Tests", Wear, 186-187 (1995) 105-116.

Kleimann et al., "Formation of Wide and Deep Pores in Silicon by Electrochemical Etching", Materials Science and Engineering, B69-70 (2000) 29-33.

Kolasinski, Kurt W., "Silicon Nanostructures from Electroless Electrochemical Etching", Current Opinion in Solid State and Materials Science, 9 (2005) 73-83.

Pei et al., "Silicon Nanowires Grown from Silicon Monoxide Under Hydrothermal Conditions", Journal of Crystal Growth, 289 (2006) 423-427.

Chen et al., "Selective Etching of Silicon in Aqueous Ammonia Solution", Sensors and Actuators, A 49 (1995) 115-121.

Maranchi et al., "Interfacial Properties of the a-Si/Cu:Active-Inactive Thin-Film Anode Systems for Lithium-Ion Batteries", Journal of the Electrochemical Society: 153 (6) (2006) A1246-A1253.

Nakahata et al., "Fabrication of Lotus-Type Porous Silicon by Unidirectional Solidification in Hyrdogen", Materials Science and Engineering A 384 (2004) 373-376.

Niparko, J.K. (Editor), "Cochlear Implant Technology", Pub., Lippincott Williams and Wilkins, Philadelphia, (2000) 108-121.

Ohara et al., "A Thin Film Silicon Anode for Li-Ion Batteries Having a Very Large Specific Capacity and Long Cycle Life", Journal of Power Sources, 136 (2004) 303-306.

Peng et al., "Dendrite-Assisted Growth of Silicon Nanowires in Electroless Metal Deposition", Adv. Funct. Mater., 13, No. 2 (2003) 127-132.

Peng et al., "Synthesis of Large-Area Silicon Nanowire Arrays via Self-Assembling Nanoelectrochemistry", Adv. Mater., 14, No. 16 (2002) 1164-1167.

Peng et al., "Uniform, Axial-Orientation Alignment of One-Dimensional Single-Crystal Silicon Nanostructure Arrays", Angew. Chem. Ind. Ed., 44 (2005) 2737-2742.

Peng et al., "Simultaneous Gold Deposition and Formation of Silicon Nanowire Arrays", Journal of Electroanalytical Chemistry, 558 (2003) 35-39.

Canham, L. T., "Diffusion of Li IN Si", Properties of Silicon, EMIS Datareviews Series No. 4 (1987) 454-462.

Qiu et al., "Self-Assembled Growth and Optical Emission of Silver-Capped Silicon Nanowires", Applied Physics Letters, vol. 84, No. 19, (2004) 3867-3869.

Kim et al., "(110) Silicon Etching for High Aspect Ratio Comb Structures", 1997 6th International Conference on Emerging Technologies and Factory Automation Proceedings, (1997) 248-252.

Sharma et al., "Thermodynamic Properties of the Lithium-Silicon System", J. Electrochem. Soc.: Electrochemical Science and Technology, vol. 123 (1976) 1763-1768.

Qiu et al., "From S1 Nanotubes to Nanowires: Synthesis, Characterization, and Self-Assembly", Journal of Crystal Growth, 277 (2005) 143-148.

Tokoro et al., "Anisotropic Etching Properties of Silicon in KOH and TMAH Solutions", Proceedings of the 1998 International Symposium on Micromechatronics and Human Science (1998) 65-70.

Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.

Wagner et al., "Vapor-Liquid-Solid Mechanism of Single Crystal Growth", Applied Physics Letters, vol. 4, No. 5 (1964) 89-90.

Lang, Walter, "Silicon Microstructuring Technology", Materials Science and Engineering, R17 (1996) 1-55.

Liu et al., "Effect of Electrode Structure on Performance of Si Anode in Li-Ion Batteries: Si Particle Size and Conductive Additive", Journal of Power Source, 140 (2005) 139-144.

Wen et al., "Chemical Diffusion in Intermediate Phases in the Lithium-Silicon System", Journal of Solid State Chemistry, 37 (1981) 271-278.

Weydanz et al., "A Room Temperature Study of the Binary Lithium-Silicon and the Ternary Lithium-Chromium-Silicon System for use in Rechargeable Lithium Batteries", Journal of Power Sources, 81-82 (1999) 237-242.

Yan et al., "$H_2$-Assisted Control Growth of Si Nanowires", Journal of Crystal Growth, 257 (2003) 69-74.

Liu et al., "A Novel Method of Fabricating Porous Silicon Material: Ultrasonically Enhanced Anodic Electrochemical Etching", Solid State Communications, 127 (2003) 583-588.

Zhang et al., "Bulk-Quantity Si Nanowires Synthesized by SiO Sublimation", Journal of Crystal Growth, 212 (2000) 115-118.

Wong et al., "Controlled Growth of Silicon Nanowires Synthesized Via Solid-Liquid-Solid Mechanism", Science and Technology of Advanced Materials, 6 (2005) 330-334.

Zhang et al., "Synthesis of Thin Si Whiskers (Nanowires) Using $SiCl_4$", Journal of Crystal Growth, 2006 (2001) 185-191.

Yoshio et al., "Electrochemical Behaviors of Silicon Based Anode Material", Journal of Power Sources, 153 (2006) 375-379.

Zhang et al., "Catalytic Growth of $^x$-$FiSi_2$ and Silicon Nanowires", Journal of Crystal Growth, 280 (2005) 286-291.

Japanese Search Report dated Sep. 24, 2009.

* cited by examiner

STRUCTURED SILICON ANODE

This application is a continuation of U.S. Ser. No. 12/074,642, filed Mar. 4, 2008 which is a division of U.S. Ser. No. 10/533,822, filed Aug. 31, 2005, now U.S. Pat. No. 7,402,829, issued Jul. 22, 2008. The U.S. Pat. No. 7,402,829 patent in turn was the entry into the National Phase in the U.S. of International Application No. PCT/GB2003/004783, filed Nov. 5, 2003.

The present invention relates to structured silicon anodes for lithium battery applications.

Silicon is recognised as a potentially high energy per unit volume host material for lithium in lithium battery applications[1]. Attempts at realising this potential have met with only partial success when nano-composites of silicon powder and carbon black have been used[2]. The major technical problem associated with the use of silicon/lithium appears to be the mechanical failure brought about by the repeated large volume expansion associated with alloying[1c,3]. Metallic and intermetallic anodic host materials, other than layer materials such as graphite, are reported to disintegrate after a few lithium insertion/extraction cycles[3,4] unless in fine powder form (sub-micron range). Since we are interested in finding a way to make a lithium battery integrated onto a silicon chip we need to find a solution to this materials problem. It is envisaged that the principal applications area for lithium batteries integrated into a chip would be in the medical field. Thus the well-developed practice of cochlea implants appears to be an area that would benefit from an integrated battery supply[5].

This invention seeks to realise the potential of the silicon-lithium system to allow the possibility of a lithium battery integrated on to a silicon chip.

Accordingly this invention provides a method of fabricating sub-micron silicon electrode structures on a silicon wafer. Preferably these structures comprise pillars.

For a silicon-lithium system the basic cell diagram can be represented as Li|Li$^+$-electrolyte|Si, for this cell the cathodic process is, discharge of lithium onto silicon to form an alloy (charging), and the anodic process is lithium extraction or de-alloying (discharging). The EMF data reported by Wen and Huggins[6] for the liquid system at 415° C. is shown bracketed below and the solid system at room temperature[7] is shown un-bracketed below. Their results (in mV vs. Li) are: Si/Li$_{12}$Si$_7$-582(332); Li$_{12}$Si$_7$/Li$_7$Si$_3$-520(288); Li$_7$Si$_3$/Li$_{13}$Si$_4$-428 (158); Li$_{13}$Si$_4$/Li$_{21}$Si$_5$-~300 (44).

It will be appreciated that the formation of Li$_{12}$Si$_7$ in place of Si results in a significant volume change (the alloy is 2.17 times bigger). On a conventional silicon wafer suitable for use as an anode for a lithium battery this volume change leads to crack formation and pulverisation however due to their small size and configuration sub-micron anode structures made in accordance with the invention, are be able to tolerate the conditions occasioned by the massive volume changes occasioned by lithium alloying/de-alloying.

In tests structured electrodes of sub micron diameter Si pillars maintained their structural integrity throughout the cycling whereas planar Si electrodes showed cracks (2 micron features) after 50 cycles. An appropriate size restriction to achieve suitable electrodes is that the silicon pillars should not exceed a fractional surface coverage (F) of ~0.5.

An embodiment of the invention will now be described by way of non-limiting example only, with reference to the accompanying drawings, in which.

The electrochemical discharge of lithium on silicon and its subsequent chemical reaction destroys the silicon lattice, giving rise to the swelling of the solid, producing amorphous Si/Li phases[13]. The first new phase to appear in the system is Li$_{12}$Si$_7$. This compound, and all the rest up to Li, is a so-called Zintl-Phase Compound (ZPC), and consists of simple, electropositive, cations and complex co-valently bound, multiply charged, electronegative, anions. Of course the charge ascribed to the "ions" is purely notional: the actual charge (depending upon definition) is less than the formal value and may be considerably less, hence the bulk lithium will be referred to as Li$^\circ$ and bulk silicon as Si$_n^\circ$.

It is important to form some idea of the mechanism of lithiation and de-lithiation of silicon. It is proposed that:

(i) Discharged lithium reacts with silicon forming a ZPC film with atomically continuous contact to the silicon.

(ii) Lithium excess diffuses (via a vacancy mechanism) through the compact ZPC film to react with silicon at the Si/ZPC interface, thickening the ZPC film, without void formation.

These processes might be represented by: Li$^+$(el)+e$^-$ (solid)→Li(ads.); Li(ads.)+V(ZPC)→Li$^\circ$ (ZPC)$_s$; Li$^\circ$ (ZPC)$_s$→diffusion→Li$^\circ$ (ZPC)$_{ZPC/Si}$; x Li$^\circ$ +ySi$^\circ$ →ZPC (Li$_{x/y}$Si).

(Li(ads) is Li adsorbed on ZPC; V is a Li$^\circ$ vacancy in ZPC)

(iii) The amorphous[13] ZPC film is deformable and so does not give rise to significant stress induced cracking on volume change.

The diffusion coefficient, D, for Li in crystalline Si[14] is ~10$^{-14}$ cm$^2$s$^{-1}$, Li in ZPC is expected to be faster; a value of D 10$^{-12}$ cm$^2$s$^{-1}$ would be enough to account for all the processes carried out in this study. This model for ZPC film formation is in many ways analogous to the model of SiO$_2$ layer formation on silicon due to Deal and Grove[15]: but the details are different and will be treated elsewhere.

The model for ZPC decomposition is, in broad terms, the reverse of the above steps. Discharge of Li$^\circ$ at the electrolyte interface produces a surface vacancy in the ZPC. Locally Li$^\circ$ moves into the vacancy so the vacancy diffuses back to the ZPC/Si interface: at the interface Si$_n$ rejoins the Si phase (where it is said to be polycrystalline[13]) and vacancies coalesce to produce larger void spaces. These spaces, as they coalesce further and grow, give rise to the crack like features seen in the SEM pictures in FIGS. 4c,d and 5. Such a process has been described by Beaulieu et al[16] for lithium removal from silicon/tin alloys.

It has been shown that repeated Li alloying/de-alloying of planar Si can be carried out without pulverisation of the substrate, cf. FIG. 5. However, as noted, the alloy/de-alloy process is limited by diffusion through the ZPC layer. In order to obtain charging rates suitable for various applications it is necessary to increase the surface area of the Si/electrolyte interface; and this has been done using pillar fabrication. Previous attempts using silicon particles have failed because the particle-to-particle contacts change and part with cycling[2]. The pillar structures, on the other hand, are largely maintained as evidenced by the flatness of the pillar tops after 50 cycles, cf. FIG. 4.

Efficiencies of <100% reported here are attributed mainly to reaction, on alloying, with the electrolyte, and to a lesser extent isolation of regions of ZPC. The data presented here show that reduced current density on both alloying and de-alloying results in improving efficiency. It is supposed that this improvement comes mainly from a reduced surface concentration of adsorbed Li on alloying and accessing all the lithium in the ZPC on de-alloying.

There is large scope for further increasing the surface-to-volume ratio of the pillar construction, for example, pillars of diameter (d) ~0.3 microns and 6 micron height (H). The pillar volume (v) would be, FH, and for F=0.4, v=2.4×10$^{-4}$ cc/cm$^2$, which is equivalent, when converted to $Li_{12}Si_7$, to a capacity of 3.81×10$^3$ v=914 microAhrcm$^{-2}$. The surface area of such a pillar structure is ~4 FH/d, which is the basis of the much improved characteristics.

To make structures in accordance with the invention the following method may be used, namely "Island Lithography" as disclosed in international patent No. WO01/13414. This method employs cesium chloride as the resist in the lithographic step in the fabrication of pillar arrays. It works as follows. A thin film of CsCl is vacuum deposited on the clean, hydrophilic, surface of the Si substrate. This system is then exposed to the atmosphere at a controlled relative humidity. A multilayer of water absorbs on the surface, the CsCl is soluble in the water layer (being more soluble at places of higher radius of curvature). The CsCl re-organises into a distribution of hemispherical islands, driven by the excess surface energy associated with CsCl surface curvature. Such arrays are useful in making structures for various studies involving nanoscale phenomena. In this case reactive ion etching is preferably used, with the islands acting as X masks so that removal of the surrounding silicon forms the desired pillar structures.

A study of the kinetics of the formation of island arrays has been carried out on GaAs surfaces[9] and more recently, and more extensively, on Si/SiO$_2$ surfaces[10] where the technique and results are described in detail. The process variables are: CsCl film thickness (L); humidity (RH), time of exposure (t). The resulting island array has a Gaussian distribution of diameters, average diameter (<d>) standard deviation (±s) and surface fractional coverage (F). Having made the CsCl resist array the next step is reactive ion etching (RIE) to produce the corresponding array of pillars[11]. The RIE process variables are: feed-gas composition, flow rate and chamber pressure; RF power; dc bias; etch time. The results are characterised by the etch depth, corresponding to pillar height (H), and the wall angle, namely the angle that the pillar wall makes with the wafer plane; it is chosen in this study to be close to 90°. The examples reported in this work were etched in a Oxford Plasmalab 80 apparatus. The etch gas was (O$_2$: Ar:CHF$_3$) in the ratio 1:10:20; feed rate 20 sccm; chamber pressure, 50 milli pascals; RF power, 73 watts; dc bias 200V.

The pillar structure reported in this study (K-series) was characterised as <d>=580 nm±15 nm; F=0.34; H=810 nm: it was made using, L=80 nm; RH=40%; t=17.5 hrs. After fabrication the silicon samples were washed in water; etched for 20 seconds in NH$_4$OH(28 w % NH$_3$):H$_2$O$_2$(100 v/v):H$_2$O in equal volume ratios; the etchant was flooded away with de-ionized water and blow dried.

Of course the structures may also be fabricated by other known techniques, such as photolithography, which produce regular arrays of features rather than the scattered distribution produced by island lithography.

Figure 1:
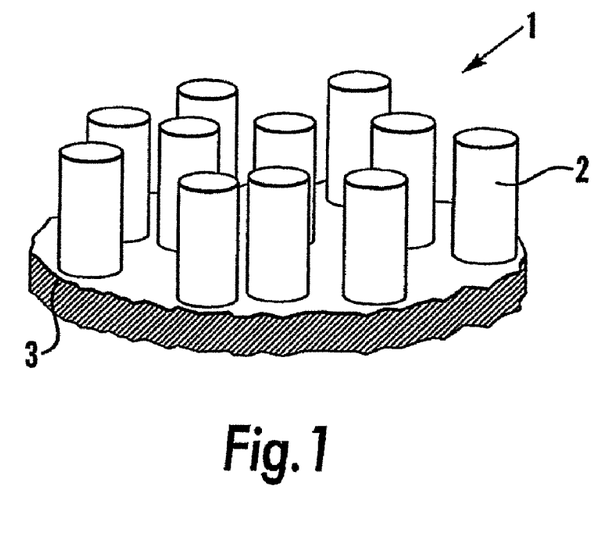
FIG. 1 is a schematic view of a structured electrode.

FIG. 1 is a schematic view of a structured electrode, in accordance with the invention and as used in the following tests, it shows a part sectional view of the anode in which the pillars 2 can clearly be seen on the silicon wafer 3.

Figure 6:
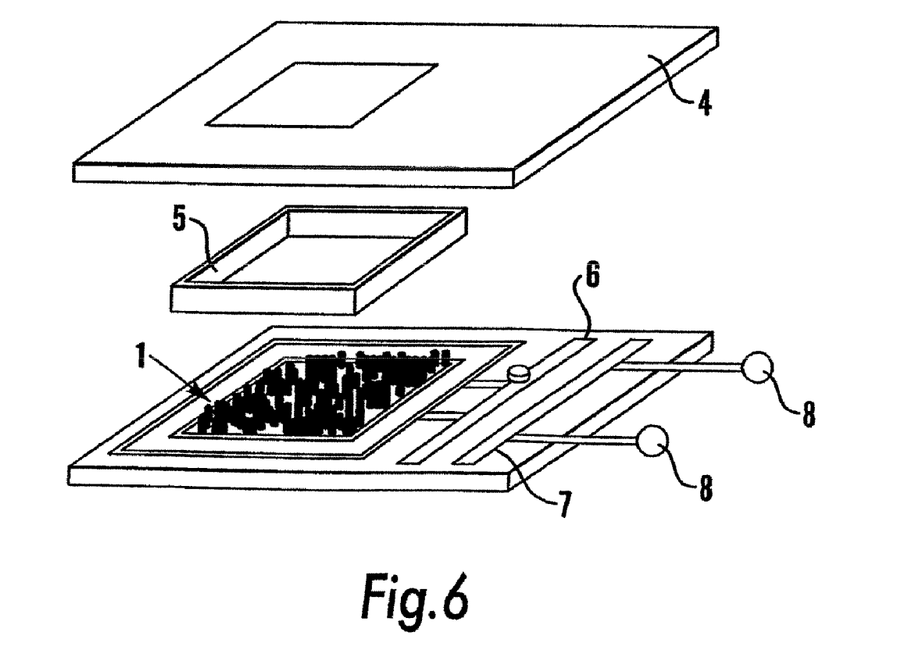
FIG. 6 shows a lithium battery in accordance with the present invention.

FIG. 6 shows a lithium battery, comprising a typical embodiment of the present invention, and including an anode 1, a cathode 4, a polymer electrolyte 5, a first strip 6 representing a rectifier circuit connected to a coil encircling the anode for charging purposes, a second strip 7 representing the output circuit (driven by the battery), and a pair of wires 8 for connection to the device to be driven.

Electrochemical tests were performed in a three-electrode, glass, cell where the Si sample is the working electrode and metallic Li is used for both the counter and reference electrodes. A 1 M solution of LiClO$_4$ (Merck Selectipurâ) in ethylene carbonate:diethyl carbonate (Merck Selectipurâ), (1:1) w/w solvent was used as the electrolyte. The cell was assembled under a dry argon atmosphere in a glove box. Ohmic contact was made to the rear side of the silicon samples electrodes using a 1:1 In—Ga eutectic alloy[12]. The electrode area was delineated using an O-ring configuration in a PTFE holder. No adhesive is used and a good electrolyte/atmosphere seal is obtained. In an earlier study we found that epoxy adhesive, used to mount a Si electrode, contaminated the active electrode surface causing spurious currents at high voltages (>2V).

Electrochemical behaviour of the cell was investigated by cyclic voltammetry (CV) and by galvanostatic measurement (voltage vs. time at constant current), using an electrochemical workstation (VMP PerkinElmer™ Instruments). The capacity referred to here is the total charge inserted into the projected electrode surface area exposed to the electrolyte (this ignores any surface area due to structuring), given as mAhcm$^{-2}$ (micro Amp hours cm$^{-2}$).

Figure 2:
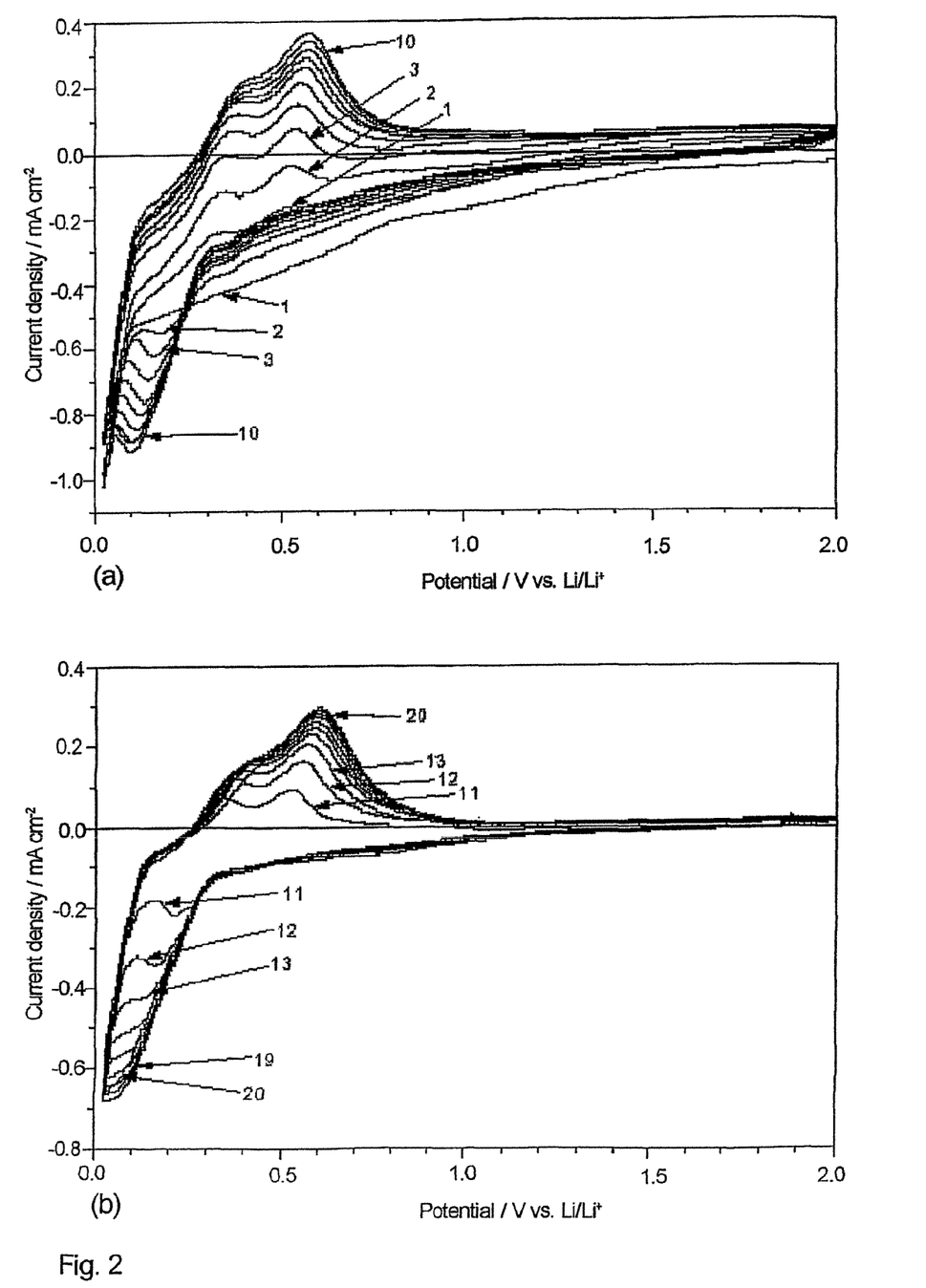
FIG. 2 shows one of a series of CV scan sets.

The results obtained were:

The response of the Li|Li$^+$-electrolyte|Si cell was measured: for this cell the cathodic process is, discharge of lithium onto silicon to form an alloy (charging), and the anodic process is lithium extraction or de-alloying (discharging). FIG. 2 shows one series of CV scan sets (details in caption). The first cycle, and to quite a large extent the second, differs from those that follow. It is conjectured that this difference is due to a "formation" effect, associated with the filming of the electrode during the first Li discharge. After the first and second cycles, the scans assume a repeatable general shape. Since these are scans in which the potential is changed slowly and the current densities are therefore small, there are no IR drop or diffusion overpotential terms, and assuming no activation overpotential, the electrode potential is a measure of the surface lithium activity. The first cathodic feature is the rapid increase in current at ~330 mV that, according to room temperature data[7], corresponds to the presence of $Li_{12}Si_7$. The lowest potential reached is 25 mV and this is taken to be associated with the presence of higher Li compounds, e.g. $Li_{21}Si_5$. The cycling sequence shows a progressive "activation" of the sample, associated with increasing breakdown of the crystalline silicon structure (see discussion). The anodic, part of the CV curve is associated with progressive de-lithiation of the electrode according to the various ZPC equilibrium potentials. For a scan rate of 1 mVs$^{-1}$ the capacity (260 mAhcm$^{-2}$) of the electrodes is roughly comparable to the pillar volume being converted to $Li_{12}Si_7$, while for the slower scan rates the capacity exceeds that of the pillar volume. The latter results point to the participation of the substrate in the alloying/de-alloying process.

Figure 3:
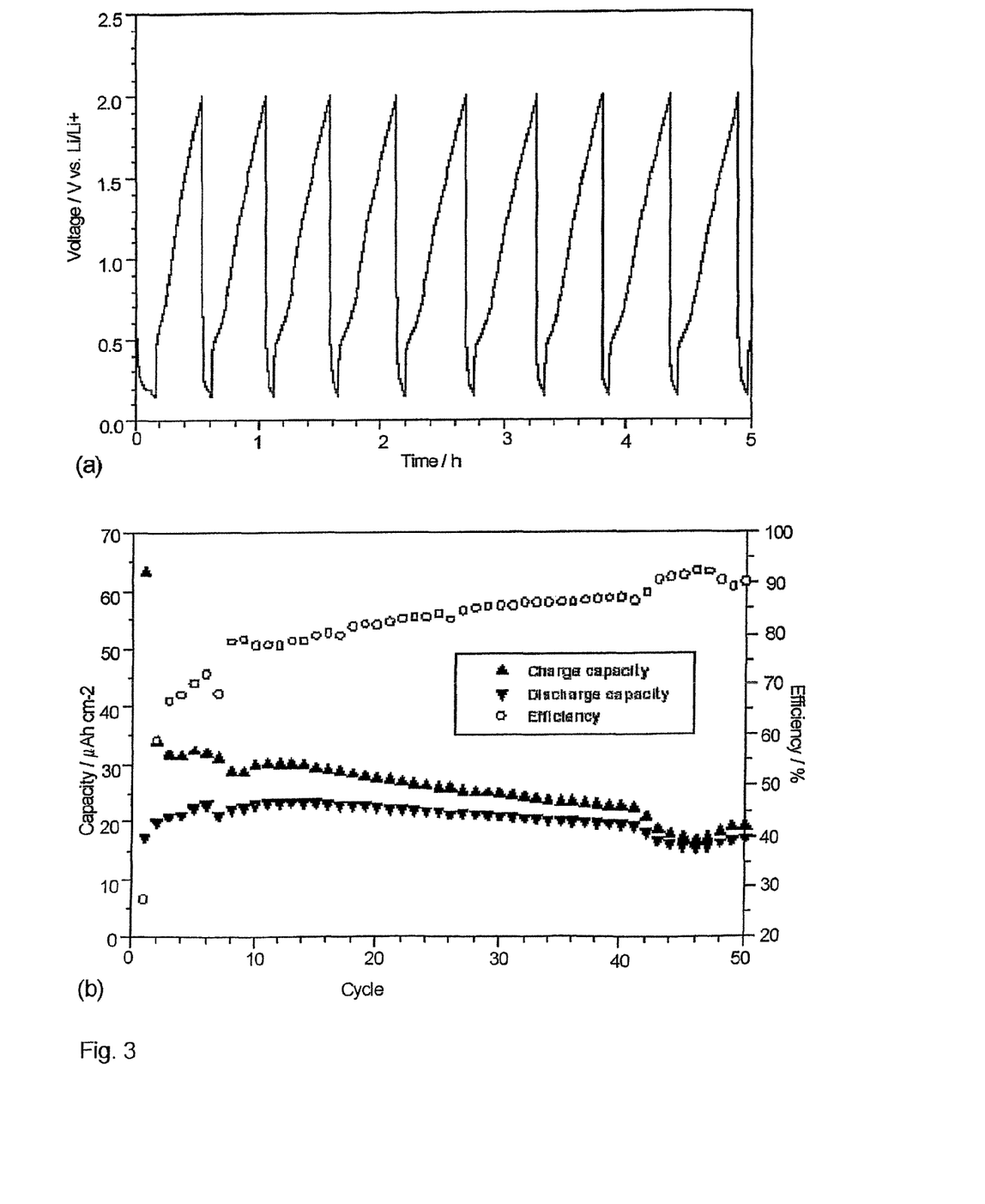
FIG. 3 shows results for a series of galvanostratic measurements.

FIG. 3 shows the results for a series of galvanostratic measurements on structured Si at two different charge/discharge current densities (details in caption).

Figure 4:
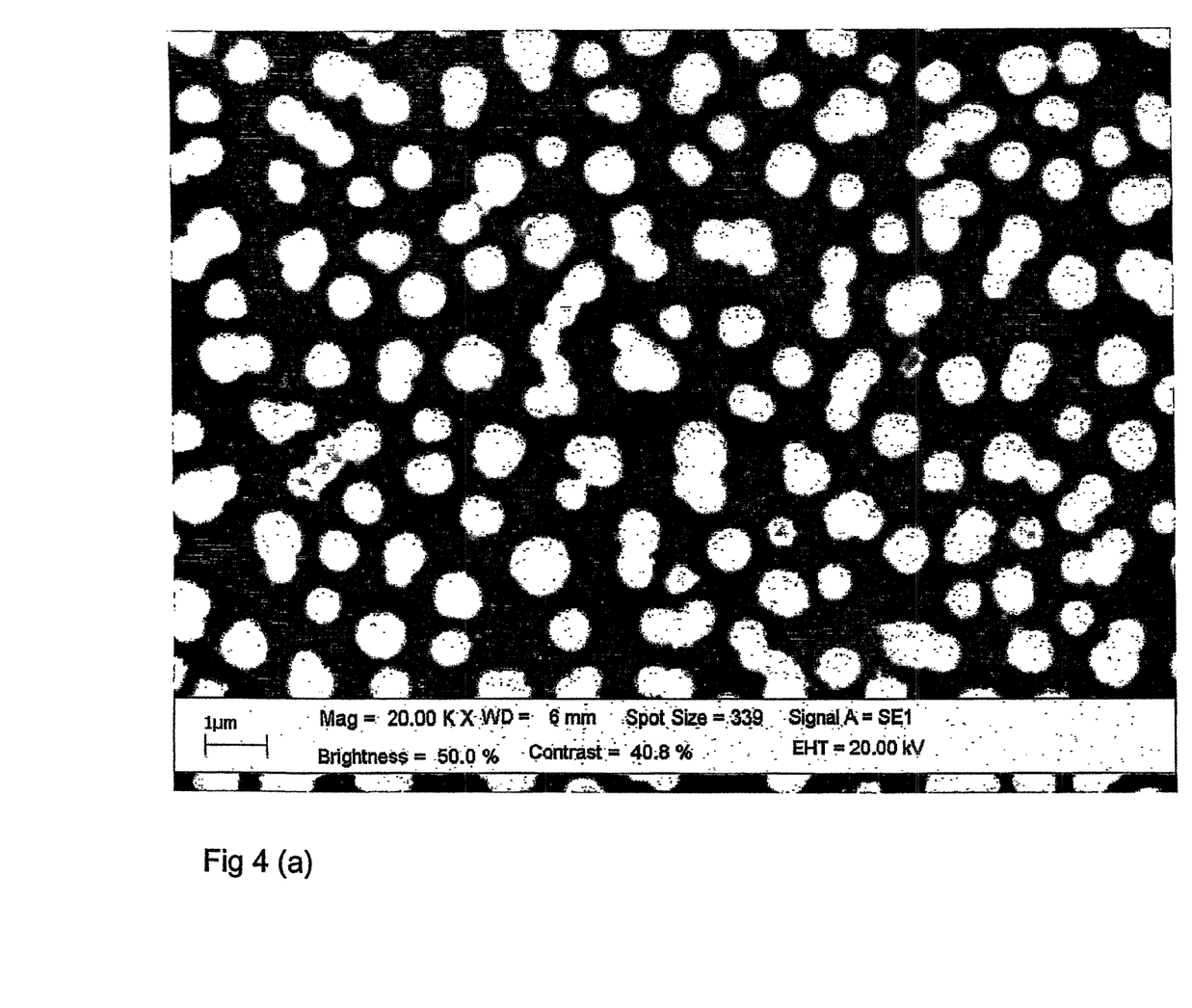
FIG. 4 shows pictures of the structure.
Figure 5:
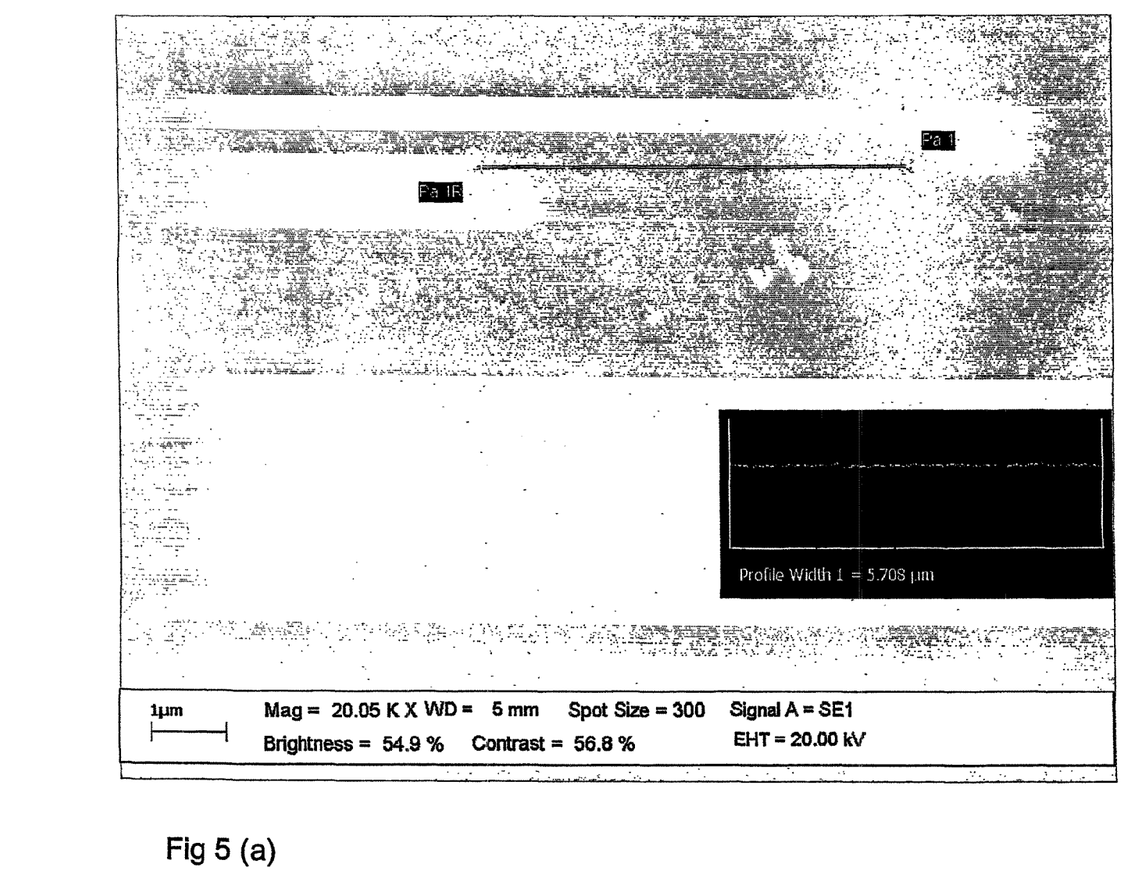
FIG. 5 shows SEM pictures of the structure.

FIG. 4 shows the structure of the K-series of silicon electrodes that were used in this study and the effects of extensive galvanostatic cycling upon that structure. The structure are clearly intact, but at the higher current density slight cracking of the bulk Si surface, below the pillars, is observed.

FIG. 5 shows the SEM pictures of the structures obtained on planar (un-pillared) Si electrodes before cycling and, separately, after galvanostatic cycling. When cycled at the lower current densities, the surface is deformed, though crack formation does not occur. Cycling at higher current densities produces wide cracks.

REFERENCES 1. (a): R. A. Sharma and R. N. Seefurth, J. Electrochem. Soc., 123, 1763 (1976); (b): B. A. Boukamp, G. C. Lash and R. A. Huggins, J. Electrochem. Soc., 128, 725 (1981); (c): R. A. Huggins, Lithium Alloy Anodes in "Handbook of Battery Materials", J. O. Besenhard Ed, Wiley-VCH, Weinheim, 359 (1999); (d): S. Bourderau, T. Brousse and D. M. Schleich, J. Power Sources, 233, 81 (1999); (e): O. Z. Zhuo, Bo Bao and S. Sinha, U.S. Pat. No. 6,334,939 B1 Jan. 1, 2002: There are many other patents relating to the use of various host materials for Li anodes.
2. Hong Li, Xuejie Huang, Liquan Chen, Zhengang Wu and Yong Liang, Electrochem. Solid-State Lett., 2, 547 (1999).
3. J. O. Besenhard, J. Yang and M. Winter, J. Power Sources, 68, 87 (1997)
4. L. Y. Beaulieu, D. Larcher, R. A. Dunlap and J. R. Dahn, J. Electrochem. Soc., 147, 3206 (2000).
5. J. K. Niparko (Editor), "Cochlea Implants", Pub., Lippincott Williams and Wilkins,
   Philadelphia, (2000)
6. C. J. Wen and R. A. Huggins, J. Solid State Chem., 37, 271 (1981).
7. W. J. Weydanz, M. Wohlfahrt-Mehrens and R. A. Huggins, J. Power Sources
   81-82, 237 (1999).
8. J-P. Colinge, "Silicon-on-Insulator Technology: Materials to VLSI",
   Kluwer Acad. Pub, Boston, Chapter 2, (1991).
9. Mino Green, M. Garcia-Parajo, F. Khaleque and R Murray, Appl. Phys. Lett.,
   63, 264 (1993.)
10. Mino Green and Shin Tsuchiya, J. Vac. Sci. & Tech. B, 17, 2074 (1999).
11. Shin Tsuchiya, Mino Green and RRA Syms, Electrochem. Solid-State Lett,
    3, 44 (2000).
12. L-C. Chen, M. Chen, T-H Tsaur, C Lien and C-C. Wan, Sensors and Actuators,
    A49, 115 (1995).
13. H. Li, X. Huang, L. Chen, G. Zhou, Z. Zhang, D. Yu, Y. J. Mo and N. Pei, Solid
    State Ionics, 135, 181 (2000).
14. "Properties of Silicon", Pub. INSPEC, The Institution of Electrical Engineers,
    London, (1988): p. 461 for solubility; p. 455 for diffusion data.
15. B. E. Deal and A. S. Grove, J. Appl. Phys., 36, 3770 (1965).
16. L. Y. Beaulieu, K. W. Eberman, R. L. Turner, L. J Krause and J. R. Dahn,
    Electrochem. Solid-State Lett., 4, A137 (2001).

The invention claimed is:

1. An energy storage device comprising:
   an anode comprising an array of sub-micron structures comprising silicon, on a substrate;
   a cathode comprising lithium; and
   a lithium-based electrolyte, arranged to form a battery.
2. A device according to claim 1 wherein the substrate comprises silicon.
3. A device according to claim 1 wherein the anode is arranged to tolerate the conditions occasioned by the volume changes caused by charging/discharging of the battery.
4. A device according to claim 1 wherein the anode is arranged to maintain structural integrity throughout a cycling of the battery.
5. A device according to claim 1 wherein the anode is arranged to withstand repeated volume expansion associated with alloying during use of the battery.
6. A device according to claim 1 wherein the array of sub-micron structures comprise an array of sub-micron pillars.
7. A device according to claim 6 wherein the pillars have a surface area of about 4 FH/d times the substrate area wherein F is the surface fractional coverage, H is the height of the pillar and d is the diameter of the pillar.
8. A device according to claim 6 in which the sub-micron pillars do not exceed a fractional coverage of 0.5 of the substrate.
9. A device according to claim 6 wherein the pillars are 0.1 to 1.0 microns in diameter and 1 to 10 microns in height.
10. A device according to claim 6 wherein the pillars are approximately 0.3 microns in diameter and 6 microns in height.
11. A device according to claim 1 in which the substrate comprises n-type silicon.
12. A device according to claim 1 made on a wafer-bonded silicon-on-insulator substrate.
13. A battery including an anode comprising: an array of sub-micron pillars comprising silicon fabricated on a substrate; and a lithium cathode, wherein a compound film is formed on the pillars in a charging step.
14. A battery according to claim 13 wherein the film is a Zintl-Phase Compound.
15. A battery according to claim 13 wherein the compound film is deformable so as not to give rise to significant stress-induced cracking during the volume change in a charging or discharging step.
16. The battery according to claim 13 wherein the substrate comprises silicon.
17. An electrode for a battery comprising sub-micron pillars comprising silicon supported on a substrate and arranged to form a battery with a lithium cathode and a lithium-based electrolyte.
18. The electrode according to claim 17 wherein the substrate comprises silicon.
19. An energy storage device comprising:
    an anode comprising an array of submicron structures comprising silicon, supported on a substrate;
    a cathode comprising lithium; and
    an electrolyte comprising lithium.

* * * * *